United States Patent
Hong

(10) Patent No.: US 8,537,074 B2
(45) Date of Patent: Sep. 17, 2013

(54) SYSTEM AND METHOD FOR SWITCHING TWO-DIMENSIONAL (2D) AND THREE-DIMENSIONAL (3D) DISPLAY MODES

(75) Inventor: Xu Hong, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 408 days.

(21) Appl. No.: 12/904,244

(22) Filed: Oct. 14, 2010

(65) Prior Publication Data

US 2012/0001899 A1 Jan. 5, 2012

(30) Foreign Application Priority Data

Jul. 1, 2010 (CN) .......................... 2010 1 0225094

(51) Int. Cl.
*G09G 5/00* (2006.01)
(52) U.S. Cl.
USPC .............................................. 345/6
(58) Field of Classification Search
USPC .............................................. 345/6
See application file for complete search history.

(56) References Cited

U.S. PATENT DOCUMENTS

| 2004/0164927 A1* | 8/2004 | Suyama et al. | 345/32 |
| 2008/0204368 A1* | 8/2008 | Han et al. | 345/55 |
| 2010/0039573 A1* | 2/2010 | Park et al. | 349/15 |

* cited by examiner

*Primary Examiner* — Kevin M Nguyen
(74) *Attorney, Agent, or Firm* — Anova Law Group, PLLC

(57) ABSTRACT

A 2D/3D switching system is provided. The 2D/3D switching system includes a 2D/3D switching device for selectively processing lights from 2D images and 3D images. The 2D/3D switching device includes a plurality of first electrodes, a plurality of second electrodes arranged corresponding to the plurality of first electrodes and separated with a distance, and a liquid crystal layer placed between the plurality of first electrodes and the plurality of second electrodes. The 2D/3D switching system also includes a driving unit coupled to the plurality of first electrodes and the plurality of second electrodes to provide driving voltages to the plurality of first electrodes and the plurality of second electrodes, and to provide at least one voltage adjustment signal to adjust corresponding driving voltages of at least one of plurality of first electrodes and the plurality of second electrodes.

13 Claims, 6 Drawing Sheets (Prior Art)

SYSTEM AND METHOD FOR SWITCHING TWO-DIMENSIONAL (2D) AND THREE-DIMENSIONAL (3D) DISPLAY MODES

CROSS-REFERENCES TO RELATED APPLICATIONS

This application claims the priority of Chinese patent application number 201010225094.4, filed on Jul. 1, 2010, the entire contents of which are incorporated herein by reference.

FIELD OF THE INVENTION

The present invention generally relates to three-dimensional (3D) display technologies and, more particularly, to the methods and systems for switching between a two-dimensional (2D) display mode and a 3D display mode.

BACKGROUND

2D/3D display switching technology is a trend for 3D display devices. With the 2D/3D display switching technology, a 3D display device can display images in a 2D display mode or a 3D display mode upon a user's request. FIG. 1 and FIG. 2 show a conventional 2D/3D switching device. As shown in FIG. 1, a 2D/3D switching device includes a micro-lens substrate 1 and a flat substrate 2 arranged in parallel. First electrode 3 and second electrode 4 are placed on the surfaces of micro-lens substrate 1 and flat substrate 2, respectively. Further, a liquid crystal layer 5 is positioned between micro-lens substrate 1 and flat substrate 2.

As shown in FIG. 1, when the optical axis of liquid crystal molecules in liquid crystal layer 5 is parallel to flat substrate 2, incident polarized lights have a polarization direction parallel to the direction of the optical axis of the liquid crystal, and the liquid crystal molecules have a refractive index of $n_e$, and $n_e$ is not equal to the refractive index of micro-lens substrate 1, $n_p$. Thus the incident polarized lights are refracted at the surface of micro-lens substrate 1. Therefore, at this point, the 2D/3D switching device shows a lens effect and can be used to realize 3D display.

As shown in FIG. 2, when the optical axis of liquid crystal molecules is perpendicular to the flat substrate 2, the incident polarized lights have a polarization direction perpendicular to the optical axis of liquid crystal, and the liquid crystal molecules have a refractive index of $n_o$, and $n_o$ is equal to the refractive index of micro-lens substrate 1, $n_p$. Thus the incident polarized lights pass directly through micro-lens substrate 1 without refraction. Therefore, at this point, the 2D/3D switching device does not show a lens effect and can be used to realize 2D display.

Further, rotation of the long axis of liquid crystal molecules is controlled by applying driving voltages on first electrode 3 and second electrode 4 to create an electric field. The driving voltages to first electrode 3 and second electrode 4 are respectively provided by two separate voltage output modules (not shown). In conventional 2D/3D switching devices, the driving voltage provided by the voltage output module for each of the first electrode and second electrode is fixed. When the driving voltage provided by one voltage output module shifts due to design errors or other reasons, the other voltage output module cannot adjust its driving voltage accordingly, which could lead to incorrect switching behavior. In addition, because the voltage output modules can only provide fixed voltages, 3D display areas are also fixed and the user cannot change locations of the 3D display areas. Further, in the conventional 2D/3D switching devices, the liquid crystal molecules can only have two rotations angles, one for liquid crystal molecules corresponding to 2D display areas and the other for 3D display areas. Thus, when displaying different 3D contents, same 3D effect may appear, resulting in grainy images.

The disclosed methods and systems are directed to solve one or more problems set forth above and other problems.

BRIEF SUMMARY OF THE DISCLOSURE

One aspect of the present disclosure includes a 2D/3D switching system. The 2D/3D switching system includes a 2D/3D switching device for selectively processing lights from 2D images and 3D images. The 2D/3D switching device includes a plurality of first electrodes, a plurality of second electrodes arranged corresponding to the plurality of first electrodes and separated with a distance, and a liquid crystal layer placed between the plurality of first electrodes and the plurality of second electrodes. The 2D/3D switching system also includes a driving unit coupled to the plurality of first electrodes and the plurality of second electrodes to provide driving voltages to the plurality of first electrodes and the plurality of second electrodes, and to provide at least one voltage adjustment signal to adjust corresponding driving voltages of at least one of plurality of first electrodes and the plurality of second electrodes.

Another aspect of the present disclosure includes a method for a 2D/3D switching device for selectively processing lights from 2D images and 3D images. The 2D/3D switching device includes a plurality of first electrodes and a plurality of second electrodes arranged corresponding to the plurality of first electrodes and separated with a distance. The method includes providing a driving unit coupled to the plurality of first electrodes and the plurality of second electrodes, and providing driving voltages by the driving unit to the plurality of first electrodes and the plurality of second electrodes. The method also includes providing at least one voltage adjustment signal by the driving unit, and adjusting corresponding driving voltages of at least one of the plurality of first electrodes and the plurality of second electrodes based on the at least one voltage adjustment signal.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
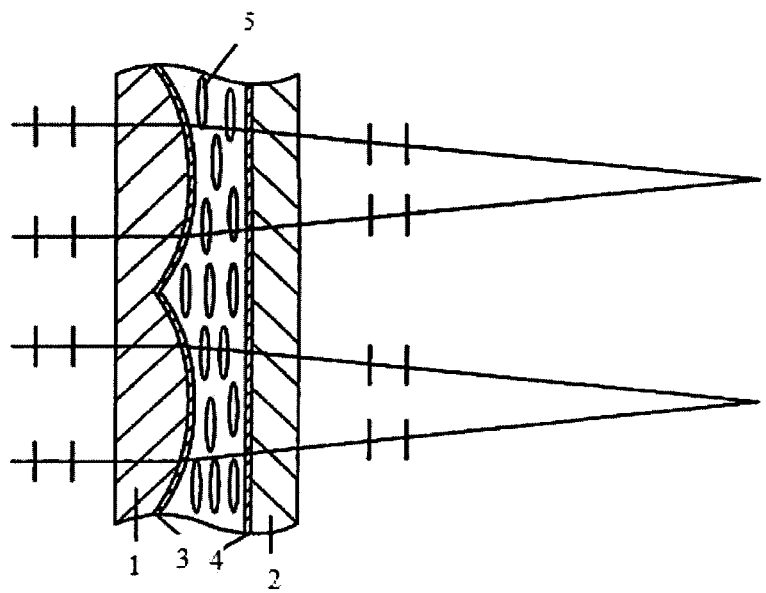
FIG. 1 illustrates a conventional 2D/3D switching device.
Figure 2:
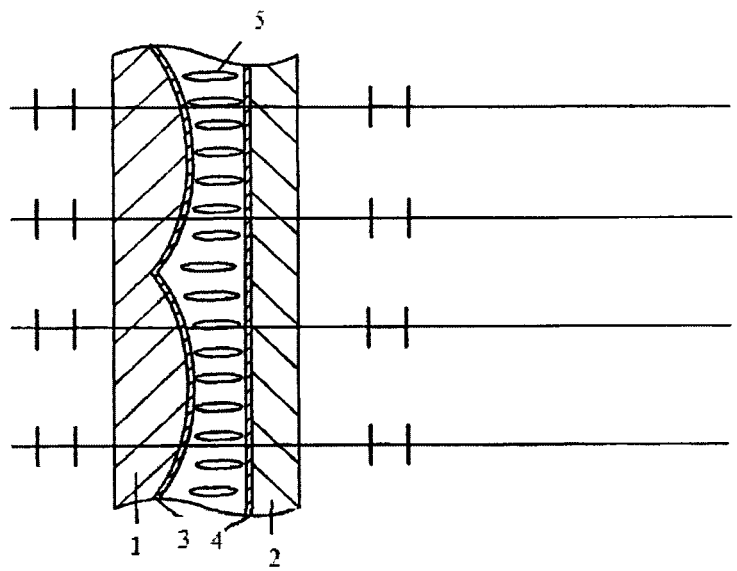
FIG. 2 illustrates a conventional 2D/3D switching device.
Figure 3:
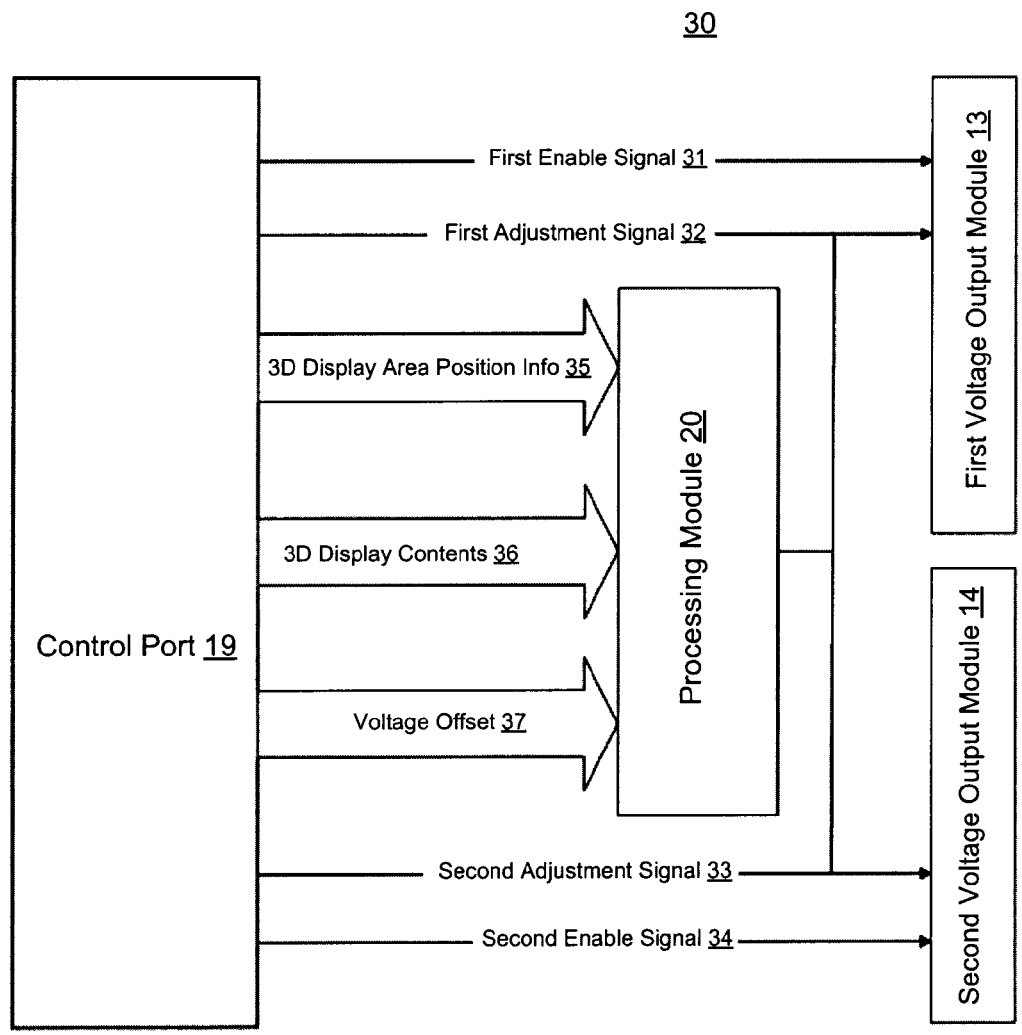
FIG. 3 illustrates a block diagram of an exemplary driving unit consistent with the disclosed embodiments.

As disclosed herein, a 2D/3D switching system generally includes a 2D/3D switching device and a driving unit for controlling and driving the 2D/3D switching device. FIG. 3 shows a block diagram of an exemplary driving unit 30 consistent with the disclosed embodiments.

As shown in FIG. 3, driving unit 30 may include a first voltage output module 13, a second voltage output module 14, a control port 19, and a processing module 20. First voltage output module 13 and second voltage output module 14 may include any appropriate driving circuitry to provide one or more voltages to a 2D/3D switching device. First voltage output module 13 and second voltage output module 14 may be enabled by first enable signal 31 and second enable signal 34. Further, voltages from first voltage output module 13 and second voltage output module 14 may also be adjusted by first adjustment signal 32 and second adjustment signal 33, respectively.

Control port 19 may include any appropriate device capable of interfacing with certain external systems or devices to receive certain signals. For example, control port 19 may be interfacing with a 3D display device, such as a computer, a television set, a smart phone, or a consumer electronic device. Through control port 19, the 3D display device may send first enable signal 31 to first voltage output module 13 to enable first voltage output module 13, and may also send second enable signal 34 to second voltage output module 14 to enable second voltage output module 14. The 3D display device may also send first adjustment signal 32 and second adjustment signal 33 to first voltage output module 13 and second voltage output module 14, respectively, to adjust output voltages dynamically.

Further, the 3D display device may also send 3D display area position information 35, 3D display contents 36, and voltage offset 37 to processing module 20 for further processing. Processing module 20 may include any appropriate device capable of processing received information and providing control signals to first voltage output module 13 and second voltage output module 14. For example, processing module 20 may include a processor such as a graphic processing unit (GPU), general purpose microprocessor, digital signal processor (DSP) or microcontroller, and application specific integrated circuit (ASIC). Processing module 20 may also include other devices such as memory devices, communication devices, input/output devices, driving circuitry, and storage devices, etc. Further, processing module 20, or the processor of processing module 20, may execute sequences of computer program instructions to perform various processes associated with driving unit 30.

Figure 4:
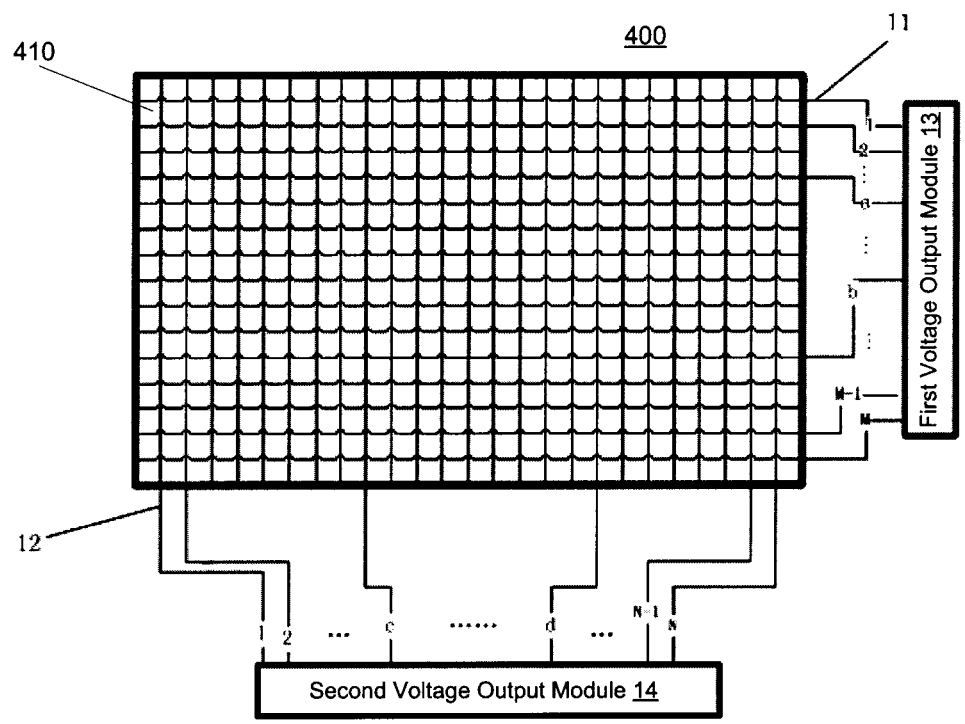
FIG. 4 illustrates a block diagram of an exemplary 2D/3D switching system consistent with the disclosed embodiments.

During operation, driving unit 30 provides driving voltages to 2D/3D switching device(s), either the external 3D display device or processing module 20 or both may generate voltage adjustment signals (i.e., first adjustment signal 32 and second adjustment signal 33) to adjust first voltage output module 13 and/or second voltage output module 14. FIG. 4 shows an exemplary 2D/3D switching system 400.

As shown in FIG. 4, 2D/3D switching system 400 may include a 2D/3D switching device 410 and driving unit 30 (e.g., first voltage output module 13 and second voltage output module 14). 2D/3D switching device 410 includes first electrodes 11 and second electrodes 12. A liquid crystal layer (not shown) is placed between first electrodes 11 and second electrodes 12. Other components may also be included.

First voltage output module 13 is coupled to first electrodes 11 of 2D/3D switching device 410. First electrodes 11 include a plurality of first electrodes 1, 2, . . . , M−1, M, arranged in parallel with a certain distance, where M is an integer.

First electrode a and first electrode b are exemplary first electrodes. Further, second voltage output module 14 is coupled to second electrodes 12 of 2D/3D switching device 410. Second electrodes 12 include a plurality of second electrodes 1, 2, . . . , N−1, N, arranged in parallel with a certain distance, where N is an integer. Second electrode c and second electrode d are exemplary second electrodes.

The M number of first electrodes 11 and the N number of second electrodes 12 may be positioned perpendicular to each other (i.e., crossing each other) to form electric fields. Other arrangement may also be used. Liquid crystal molecules of the liquid crystal layer may be controlled by electric fields generated between first electrodes 11 and second electrodes 12 to achieve 2D and 3D display effects by rotating the long axis with different degrees.

First electrodes 11 and second electrodes 12 may include any appropriate types of electrodes. For example, as shown in FIG. 4, first electrodes 11 and second electrodes 12 are strip electrodes arranged in a crossing arrangement. Other arrangements may also be used. In certain other embodiments, first electrodes 11 may include a plurality of driving electrodes while second electrodes 12 may include a common electrode.

In operation, first voltage output module 13 provides voltages to the plurality of first electrodes 11 under the control of first enable signal 31, and second voltage output module 14 provides voltages to the plurality of second electrodes 12 under the control of second enable signal 34. Further, first voltage output module 13 may receive first adjustment signal 32 to dynamically adjust output voltages to first electrodes 11, and second voltage output module 14 may receive second adjustment signal 33 to dynamically adjust output voltages to second electrodes 12.

For example, output voltages of first voltage output module 13 and/or second voltage output module 14 may be monitored, and the values of the output voltages may be compared with one or more predetermined or standard voltages to determine whether the output voltages have been shifted during operation. If a shifted value is beyond a permitted range, incorrect switching may occur. Processing module 20 of driving unit 30 or the 3D display device controlling driving unit 30 may calculate a voltage offset 37 and may generate first adjustment signal 32 and/or second adjustment signal 33 to first voltage output module 13 and/or second voltage output module 14 to adjust the output voltages such that proper output voltages are provided to first electrodes 11 and/or second electrodes 12.

Figure 5:
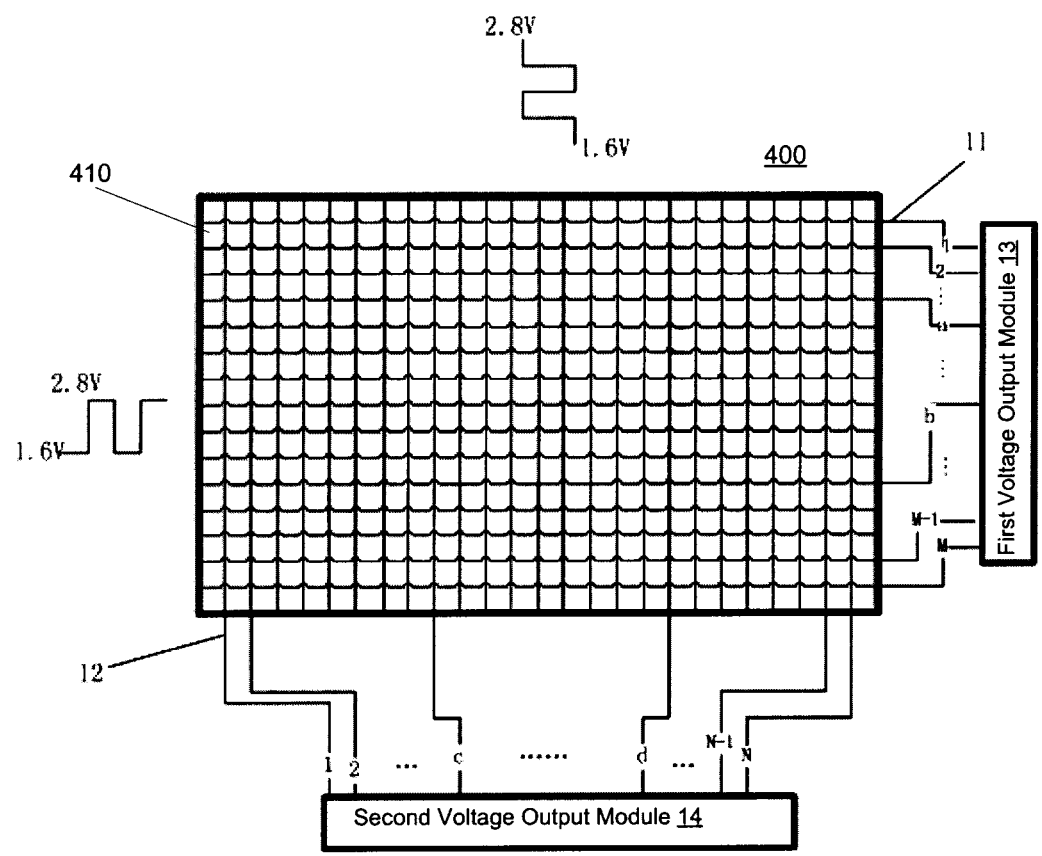
FIG. 5 illustrates an exemplary operation consistent with the disclosed embodiments.

FIG. 5 shows an exemplary operation consistent with the disclosed embodiments. The 3D display device displays only 2D images on an entire display screen, and thus may control driving unit 30 to set 2D/3D switching device 410 for only 2D display. As shown in FIG. 5, first voltage output module 13 may provide a first driving voltage to each of first electrodes 11, and the amplitude of the first driving voltage may have a first value (e.g., 1.6V) and a second value (e.g., 2.8V). The amplitude of the first driving voltage may change between the first value and the second value according a certain pattern, such as a pulse pattern as shown in FIG. 6.

Further, second voltage output module 14 may provide a second driving voltage to each of second electrodes 12, and the amplitude of the second driving voltage may have a first value (e.g., 1.6V) and a second voltage (e.g., 2.8V). The amplitude of the second driving voltage may change between the first value and the second value corresponding to the pattern of first voltage output module 13 (e.g., a pulse pattern). For example, when the first driving voltage is 1.6V, the second driving voltage is set to 2.8V; when the first driving voltage is 2.8V, the second driving voltage is set to 1.6V. Thus, a voltage difference between first electrodes 11 and second electrodes 12 can be always kept at ±1.2V. Therefore, the liquid crystal molecules in the 2D/3D switching device only have a first rotation angle such that a 2D display mode is provided and only 2D images can be display on the entire display screen.

The first driving voltage, the second driving voltage, and the voltage difference between the first driving voltage and the second driving voltage in the 2D display mode may be monitored. If one or both of the first driving voltage and the second driving voltage have a voltage value that is beyond a predetermined range, first adjustment signal 32 and/or second adjustment signal 33 may be provided to adjust the voltage values of the first driving voltage and the second driving voltage. Further, if one of the first driving voltage and the second driving voltage is shifted such that the voltage difference is out of an operation range, the other one of the first driving voltage and the second driving voltage may be adjusted such that the voltage difference is maintained within the operation range for 2D display.

Figure 6:
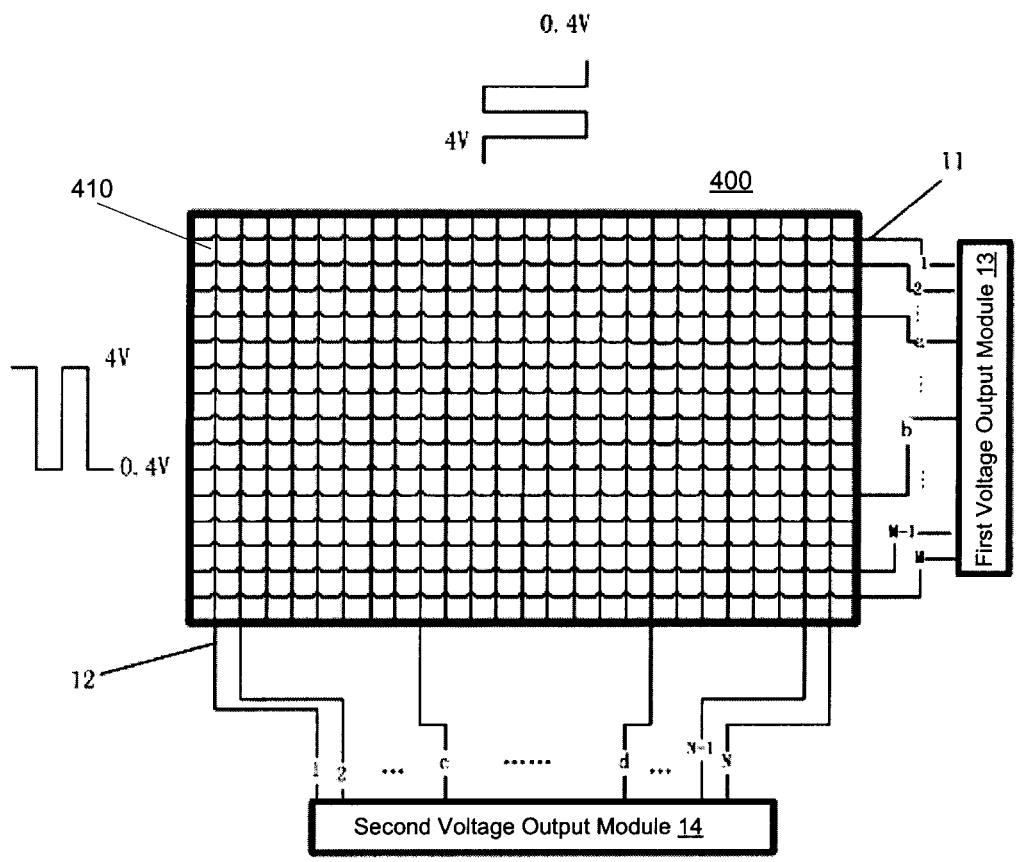
FIG. 6 illustrates another exemplary operation consistent with the disclosed embodiments.

FIG. 6 shows another exemplary operation consistent with the disclosed embodiments. The 3D display device displays only 3D images on an entire display screen, and thus may control the driving unit 30 to set 2D/3D switching device 410 for only 3D display. As shown in FIG. 6, the amplitude of the first driving voltage may have a third value (e.g., 0.4V) and a fourth value (e.g., 4.0V). The amplitude of the first driving voltage may change between the third value and the fourth value according to, for example, a pulse pattern.

Further, the amplitude of the second driving voltage may also have a third value (e.g., 0.4V) and a fourth voltage (e.g., 4.0V). The amplitude of the output voltage may change between the third value and the fourth value corresponding to the pattern of first voltage output module 13 (e.g., a pulse pattern). For example, when the first driving voltage is 0.4V, the second driving voltage is set to 4.0V; when the first driving voltage is 4.0V, the second driving voltage is set to 0.4V. Thus, a voltage difference between first electrodes 11 and second electrodes 12 can be always kept at ±3.6V. Therefore, the liquid crystal molecules in the 2D/3D switching device only have a second rotation angle such that a 3D display mode is achieved and only 3D images can be display on the entire display screen.

The first driving voltage, the second driving voltage, and the voltage difference between the first driving voltage and the second driving voltage in the 3D display mode may also be monitored. If one or both of the first driving voltage and the second driving voltage have a voltage value that is beyond a predetermined range, first adjustment signal 32 and/or second adjustment signal 33 may be provided to adjust the voltage value of the first driving voltage and the second driving voltage. Further, if one of the first driving voltage and the second driving voltage is shifted such that the voltage difference is out of an operation range, the other one of the first driving voltage and the second driving voltage may be adjusted such that the voltage difference is maintained within the operation range for 3D display.

In addition, processing module 20 may generate first adjustment signal 32 and/or second adjustment signal 33 based on 3D display contents 36 to adjust voltages from first voltage output module 13 and/or second voltage output module 14, respectively. That is, in the 3D display mode, first voltage output module 13 and second voltage output module 14 may provide various driving voltages in addition to the third value and the fourth value. For different 3D display contents, different 3D display effects may be needed. Thus, by dynamically adjusting the voltage difference between first electrodes 11 and second electrodes 12 based on various driving voltages, liquid crystal molecules may rotate in different angles to realize different degrees of 3D effects, and to improve the clarity of 3D images and to reduce grainy effects.

Figure 7:
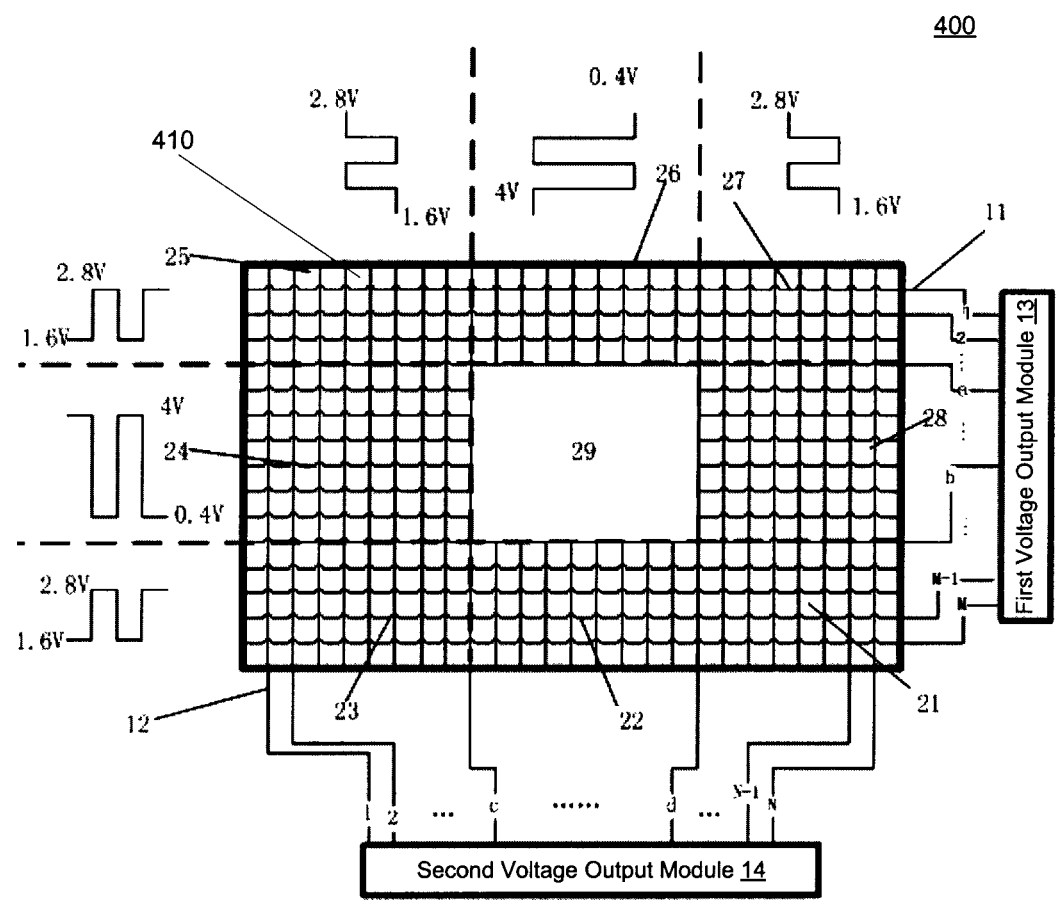
FIG. 7 illustrates another exemplary operation consistent with the disclosed embodiments.

Further, position information of 3D display areas in a display screen may also be used by processing module 20 to provide first adjustment signal 32 and/or second adjustment signal 33 based on 3D display contents 36 to adjust voltages from first voltage output module 13 and/or second voltage output module 14. For example, if a user changes the location or position of a 3D display area, voltages from first voltage output module 13 and/or second voltage output module 14 need to be adjusted accordingly. FIG. 7 shows an exemplary operation of 2D/3D switching system consistent with the disclosed embodiments.

As shown in FIG. 7, 2D/3D switching device 410 may include multiple display areas corresponding to different display areas from a 3D display device. For example, 2D/3D switching device 410 may include display areas 21, 22, 23, 24, 25, 26, 27, 28, and 29, a total of 9 display areas. First electrodes 11 and second electrodes 12 may be arranged to support these different display areas. For example, display area 29 is controlled by first electrodes a-b and second electrodes c-d. Position information of a display area may include coordinates of four corner points of the display area, or coordinates of edges of the display area.

Further, different display areas may display either 2D or 3D images. For example, display areas 21-28 may be configured to display 2D images, while display area 29 may be configured to display 3D images. First voltage output module 13 may provide a driving voltage of the third value (e.g., 0.4V) and the fourth value (e.g., 4.0V) for each of first electrodes from first electrodes a-b; while providing a driving voltage of the first value (e.g., 1.6V) and the second value (e.g., 2.8V) to each of remaining first electrodes. At the same time, second voltage output module 14 may provide a driving voltage of the third value (e.g., 0.4V) and the fourth value (e.g., 4.0V) for each of second electrodes from second electrodes c-d; while providing a driving voltage of the first value (e.g., 1.6V) and the second value (e.g., 2.8V) to each of remaining second electrodes.

Therefore, in display area 29, when the driving voltage on each of first electrodes a-b is 0.4V, the driving voltage on each of second electrodes c-d is 4.0V; and when the driving voltage on each of first electrodes a-b is 4.0V, the driving voltage on each of second electrodes c-d is 0.4V. Thus, a voltage difference of ±3.6V may be maintained between first electrodes 11 (first electrodes a-b) and second electrodes 12 (second electrodes c-d), and driving voltages from first electrodes a-b and second electrodes c-d have invert phases. The display state is therefore a 3D display mode.

For display areas 21, 23, 25, and 27, a voltage difference of ±1.2V (i.e., between the first value 1.6V and the second value 2.8V) may be maintained between first electrodes 11 and second electrodes 12. That is, when the driving voltage on each of corresponding first electrodes is 1.6V, the driving voltage on each of corresponding second electrodes is set to 2.8V, and when the driving voltage on each of corresponding first electrodes is 2.8V, the driving voltage on each of corresponding second electrodes is set to 1.6V, and also driving voltages from corresponding first electrodes and second electrodes have invert phases. Thus, the display state for display areas 21, 23, 25, and 27 is therefore a 2D display mode.

Further, for display areas 22, 24, 26, and 28, a voltage difference of ±1.2V (i.e., between the first value 1.6V and the third value 0.4V, and between the second value 2.8V and the fourth value 4.0V) may also be maintained between first electrodes 11 and second electrodes 12. That is, when the driving voltage on each of corresponding first electrodes is 1.6V, the driving voltage on each of corresponding second electrodes is set to 0.4V; when the driving voltage on each of corresponding first electrodes is 2.8V, the driving voltage on each of corresponding second electrodes is set to 4.0V; when the driving voltage on each of corresponding first electrodes is 0.4V, the driving voltage on each of corresponding second electrodes is set to 1.6V; and when the driving voltage on each of corresponding first electrodes is 4.0V, the driving voltage on each of corresponding second electrodes is set to 2.8V, and driving voltages from corresponding first electrodes and second electrodes have same phases. Thus, the display state for display areas 22, 24, 26, and 28 is also a 2D display mode.

When a user switch a display mode of a display area, for example, display area 29, processing module 20 may determine driving voltages for display area 29. Further, processing module 20 may also adjust driving voltages of other display areas, including amplitude and phase, to maintain the existing display modes of the other display areas. Such adjustment may be carried to first voltage output module 13 and/or second voltage output module 14 via first adjustment signal 32 and/or second adjustment signal 33.

When the user moves a display area (e.g., display area 29), processing module 20 may receive updated 3D display area position information 35 such that a new position for display area 29 may be determined. Further, processing module 20 may generate first adjustment signal 32 and second adjustment signal 33 and send to first voltage output module 13 and second voltage output module 14 to adjust voltage values for different display areas, as explained above. Further, processing module 20 may also adjust driving voltages of other display areas, including amplitude and phase, to maintain the existing conditions of the other display areas.

If the user changes the size of a display area (e.g., display area 29), processing module 20 may also receive updated 3D display area position information 35 such that a new position for display area 29, as well as new positions of neighboring display areas, may be determined. Further, processing module 20 may generate first adjustment signal 32 and second adjustment signal 33 and send to first voltage output module 13 and second voltage output module 14 to adjust voltage values for different display areas, as explained above.

In addition, in the various examples above, first adjustment signal 32 and second adjustment signal 33 may be from control port 19 or may be generated by processing module 20. When first adjustment signal 32 and second adjustment signal 33 are generated by processing module 20, processing module 20 may obtain 3D display area position information 35, 3D display contents 36, or voltage offset 37 from control port 19, process these information, and generate appropriate voltage adjustments to first voltage output module 13 and second voltage output module 14.

By using the disclosed methods and systems, 3D display areas may be changed upon a user's request, and interferences between 2D display areas and 3D display areas may be avoided. Also, it is understood that the various voltage values used in this disclosure are for illustrative purposes. For example, an arithmetic series of voltages (i.e., a series voltages with same interval between two neighboring voltages) may be provided. Any appropriate voltages values may be used.

What is claimed is:

1. A 2D/3D switching system, comprising:
   a 2D/3D switching device for selectively processing lights from 2D images and 3D images, including:
      a plurality of first electrodes;
      a plurality of second electrodes arranged corresponding to the plurality of first electrodes and separated with a distance;
      a liquid crystal layer placed between the plurality of first electrodes and the plurality of second electrodes, and
   a driving unit coupled to the plurality of first electrodes and the plurality of second electrodes to provide driving voltages to the plurality of first electrodes and the plurality of second electrodes, and to provide at least one voltage adjustment signal to adjust corresponding driving voltages of at least one of plurality of first electrodes and the plurality of second electrodes, wherein the driving voltages include first driving voltages and second driving voltages and the driving unit further includes:
      a first voltage output module coupled to the plurality of first electrodes to provide the first driving voltages to the plurality of first electrodes; and
      a second voltage output module coupled to the plurality of second electrodes to provide the second driving voltages to the plurality of second electrodes,
   wherein:
      the first driving voltages provided to first electrodes corresponding to the 3D display area change between a first value and a second value;
      the first driving voltages provided to remaining first electrodes change between a third value and a fourth value;
      the second driving voltages provided to second electrodes corresponding to the 3D display area change between the first value and the second value and have an invert phase to the first driving voltages provided to first electrodes corresponding to the 3D display area;
      the second driving voltages provided to remaining second electrodes change between the third value and the fourth value and have a same phase with the first driving voltages provided to the remaining first electrode and an invert phase to the first driving voltage provide to the first electrodes corresponding to the 3D display area.

2. The 2D/3D switching system according to claim 1, wherein
   the driving unit is configured to provide the at least one voltage adjustment signal to the at least one of the first voltage output module and the second voltage output module to adjust the corresponding driving voltages of at least one of plurality of first electrodes and the plurality of second electrodes.

3. The 2D/3D switching system according to claim 2, wherein:
   the at least one voltage adjustment signal includes a first voltage adjustment signal and a second voltage adjustment signal, and the driving unit is further configured to:
      provide the first voltage adjustment signal to the first voltage output module to adjust the first driving voltages; and
      provide the second voltage adjustment signal to the second voltage output module to adjust the second driving voltages.

4. The 2D/3D switching system according to claim 3, wherein:
   the at least one voltage adjustment signal is generated based on position information of a 3D display area.

5. The 2D/3D switching system according to claim 1, wherein:
the first value, the second value, the third value, and the fourth value are part of an arithmetic series.

6. The 2D/3D switching system according to claim 3, wherein:
the at least one voltage adjustment signal is generated based on 3D display contents.

7. The 2D/3D switching system according to claim 3, wherein:
the at least one voltage adjustment signal is generated based on a voltage offset.

8. The 2D/3D switching system according to claim 3, wherein the driving unit further includes a processing module configured to:
determine a position change of the 3D display area;
generate the at least one voltage adjustment signal based on the position change; and
send the at least one voltage adjustment signal to at least one of the first voltage output module and second voltage output module to adjust at least one of the first driving voltages and the second driving voltages based on the at least one voltage adjustment signal.

9. A method for a 2D/3D switching device for selectively processing lights from 2D images and 3D images, the 2D/3D switching device having a plurality of first electrodes and a plurality of second electrodes arranged corresponding to the plurality of first electrodes and separated with a distance, the method comprising:
providing a driving unit coupled to the plurality of first electrodes and the plurality of second electrodes;
providing driving voltages by the driving unit to the plurality of first electrodes and the plurality of second electrodes, wherein the driving voltages includes first driving voltages and second driving voltages, and providing the driving unit further includes:
providing a first voltage output module coupled to the plurality of first electrodes to provide first driving voltages to the plurality of first electrodes; and
providing a second voltage output module coupled to the plurality of second electrodes to provide second driving voltages to the plurality of second electrodes;
providing at least one voltage adjustment signal by the driving unit;
adjusting corresponding driving voltages of at least one of the plurality of first electrodes and the plurality of second electrodes based on the at least one voltage adjustment signal;
configuring the first driving voltages provided to first electrodes corresponding to the 3D display area to change between a first value and a second value;
configuring the first driving voltages provided to remaining first electrodes to change between a third value and a fourth value;
configuring the second driving voltages provided to second electrodes corresponding to the 3D display area to change between the first value and the second value with an invert phase to the first driving voltages provided to first electrodes corresponding to the 3D display area; and
configuring the second driving voltages provided to remaining second electrodes to change between the third value and the fourth value with a same phase with the first driving voltages provided to the remaining first electrode and with an invert phase to the first driving voltage provide to the first electrodes corresponding to the 3D display area.

10. The method according to claim 9, wherein the at least one voltage adjustment signal includes a first voltage adjustment signal and a second voltage adjustment signal, and the adjusting further includes:
providing the first voltage adjustment signal to the first voltage output module to adjust the first driving voltages; and
providing the second voltage adjustment signal to the second voltage output module to adjust the second driving voltages.

11. The method according to claim 10, wherein:
the at least one voltage adjustment signal is generated based on position information of a 3D display area.

12. The method according to claim 10, further including:
monitoring the first driving voltages and the second driving voltages;
determining a voltage offset associated with a change in at least one of the first driving voltages and the second driving voltages; and
generating the at least one voltage adjustment signal based on the voltage offset; and
adjusting at least one of the first driving voltages and the second driving voltages based on the at least one voltage adjustment signal.

13. The method according to claim 9, further including:
determining a position change of the 3D display area;
generating the at least one voltage adjustment signal based on the position change; and
adjusting at least one of the first driving voltages and the second driving voltages based on the at least one voltage adjustment signal.

* * * * *